United States Patent [19]

Bird et al.

[11] Patent Number: 5,025,984
[45] Date of Patent: Jun. 25, 1991

[54] SETBACK THERMOSTAT WITH RECOVERY START TIME SELECTED NON-LINEARLY

[75] Inventors: Douglas D. Bird, Dayton; Daniel T. Uhrich, Mayer, both of Minn.

[73] Assignee: Honeywell Inc., Minneapolis, Minn.

[21] Appl. No.: 542,376

[22] Filed: Jun. 22, 1990

[51] Int. Cl.$^5$ ............................................. F23N 5/20
[52] U.S. Cl. ................................... 236/46 R; 165/12
[58] Field of Search ................ 236/46 R, 47; 165/12; 364/557

[56] References Cited

U.S. PATENT DOCUMENTS

| | | | |
|---|---|---|---|
| 4,390,959 | 6/1983 | Cabou | 236/46 R-X |
| 4,522,336 | 6/1985 | Culp | 236/46 R |
| 4,660,759 | 4/1987 | Barnard et al. | 236/46 R |
| 4,706,882 | 11/1987 | Barnard | 236/46 R |
| 4,897,798 | 1/1990 | Cler | 236/46 R |
| 4,901,917 | 2/1990 | Littell III | 236/46 R |

FOREIGN PATENT DOCUMENTS 5475977   3/1981   Japan ................. 236/46 R

*Primary Examiner*—William E. Wayner
*Attorney, Agent, or Firm*—Edward Schwarz

[57] ABSTRACT

A setback thermostat controlling a device which holds and changes the temperature in a space includes the capability of sensing and recording the difference between the time at which recovery to a new setpoint temperature occurs and the selected time at which this temperature is specified to be reached, and if the difference is nonzero, calculates a new time at which to begin recovery the next time a change to the new temperature is specified. The calculation of the time at which recovery begins takes account of the fact that greater time is required to achieve a one degree temperature change near the new setpoint temperature than far from it because of the additional thermal load on the space as temperature nears the new set point. A non-linear function is used to calculate the time at which recovery to the new temperature is begun. The invention is included in a method for operation of the device which changes the space's temperature.

20 Claims, 2 Drawing Sheets

SETBACK THERMOSTAT WITH RECOVERY START TIME SELECTED NON-LINEARLY

BACKGROUND OF THE INVENTION

In thermostatic control of heating and cooling of a space, a setback feature provides a modest amount of energy savings at almost no cost in the design of the thermostat. By setback is meant the capability to change the setpoint of the thermostat to an energy saving value at certain times of the day or week. For example, if a space such as a dwelling is unoccupied during the day, energy can be saved by reducing the thermostat setpoint temperature during the winter and perhaps raising it during the summer when air conditioning is being used. In a commercial space, the temperature setpoint can be changed to an energy-saving level when the store is closed at night and on weekends. The amount of energy saving is dependent on the difference between the setback and the normal setpoint values. Particularly when there is a substantial difference between the setback and normal setpoint values, it is difficult to predict when recovery from the setback value to the normal value should begin to assure that the occupants of the space will not be uncomfortable because recovery has not been completed at the scheduled time. To avoid this discomfort, it is typical for the occupants to start recovery in ample time to assure that recovery will be completed when desired.

The recovery time depends on the setback temperature, thermal load, heating plant characteristics, and the new setpoint temperature. One can see that determining the recovery time for a particular situation is complex and at best only a prediction because thermal load can unexpectedly vary even during the recovery period. Because of these problems, it is difficult to accurately predict the recovery time required.

There are a number of thermostat designs which attempt to improve the accuracy of determining recovery time. For example, U.S. Pat. Nos. 4,660,759 (Barnard et al.); 4,706,882 (Barnard); 4,522,336 (Culp); and Japanese Appl. No. 54-75977 (Kamimura) all teach calculating a recovery time based on the length of previous recovery times. That is, the thermostat functions according to an algorithm which records previous recovery times and adjusts the next recovery time based on the current space temperature and the new or normal setpoint temperature.

The Barnard and Barnard et al. patents as well as U.S. Pat. No. 4,390,959 (Cabou) include the outside air temperature as an additional variable on which the recovery time calculation is based. These approaches improve the performance of setback thermostats. However, reliance on previous recovery times does not take into account the non-linearities inherent in the response of space temperature to the independent variables affecting it. While performance is improved by using outside temperature to adjust response, this requires an outside temperature sensor which is an additional expense and complexity, and sometimes unsuitable for smaller installations.

BRIEF DESCRIPTION OF THE INVENTION

The performance of a setback thermostat in accurately predicting the recovery time in a particular situation can be improved by taking into account the non-linearity of the response of the device controlling the temperature in an enclosure. That is, in general when changing the enclosure temperature to a new setpoint range which requires more energy to maintain than the previous range, a degree of temperature change close to the new setpoint will take longer to achieve for the typical temperature control device which has a constant output, than a degree of temperature change further from the setpoint which requires less energy. For example, given constant heating plant output, if we consider a heating situation where the setback temperature is lower than the normal or comfort temperature, the time required to achieve each degree of temperature rise during the recovery interval constantly increases with increasing current temperature.

The furnace or air conditioner device controlling the temperature in a space is conventionally controlled by a run signal provided by a setback thermostat. Presence of the run signal activates the device to change the temperature in the space to reach at a preselectable recovery end time a preselectable comfort temperature setpoint range. This comfort temperature setpoint range does not include the current space temperature when this algorithm in the setback thermostat is active. Similar to prior art devices, such a setback thermostat includes means for receiving and recording the preselectable recovery end time and the preselectable comfort setpoint range from an external source which may be a keyboard under control of the occupant. The setback thermostat includes apparatus for generating the length value of a recovery time interval during which the run signal is provided to the control device. At the end of the recovery time interval the space temperature is projected to enter the preselectable comfort temperature setpoint range.

To incorporate the non-linearity of response mentioned earlier, there is further provided means for periodically generating a time fraction value according to a function dependant on the current space temperature and the preselectable comfort temperature setpoint range, where the time fraction value has a temperature derivative whose absolute value increases with increasing current temperature. In addition, timing means are provided for recording as the measured recovery end time, the time at which the space temperature actually enters the preselectable comfort temperature setpoint range. Other means generate and record a current lag constant value as a sum of a previously recorded lag constant plus a function of the time fraction value and the difference between a previously measured recovery end time and the preselectable recovery end time. There are means which periodically generate and record a value of the recovery time interval as a function of the current lag constant value and a current time fraction value and means for providing the run signal to the space temperature control device at the time specified by a recently generated recovery time interval value length, to achieve a space temperature which reaches the preselectable comfort temperature setpoint range at the end of the recovery time interval value, and not substantially before or after.

In a preferred embodiment the means for generating and recording the time fraction value includes means for dividing a predetermined temperature range which preferably included the preselected setpoint temperature range into a plurality of contiguous intervals to each of which is assigned a count value. These count values never become smaller, and on occasion become larger as the intervals in question are closer to the preselectable comfort temperature setpoint range. The time fraction is calculated as a function of the count values for the intervals between the current temperature and the preselectable comfort temperature setpoint range.

It is also possible to cast this invention in terms of a process which calculates the time at which change in the space temperature should start, and which uses the principles described for the apparatus of the invention.

Accordingly, one purpose of this invention is to increase the reliability of changing a space temperature from a setback to a comfort value without either discomfort for the occupants or waste of energy.

Another purpose of this invention is to take into account in establishing recovery times from setback to comfort temperatures, the non-linear response of the temperature control device in changing the space temperature.

Another purpose of the invention is to easily allow the non-linear function simulating the temperature control device response to be changed.

Other purposes and advantages of the invention will be explained in the disclosure of the invention which follows.

DESCRIPTION OF THE PREFERRED EMBODIMENT

Hardware Structure

Figure 1:
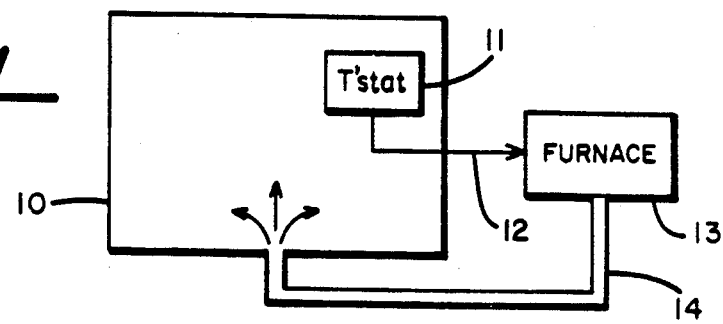
FIG. 1 shows a conventional thermostatically controlled furnace for maintaining a selectable temperature within a space.

FIG. 1 shows a conventional arrangement for controlling the temperature in an enclosure when the outside temperature is less than a comfort temperature. In such a case, of course, the space temperature within enclosure 10 is sensed by a thermostat 11 which provides a run or control signal on a path 12 to a furnace 13 which in responsive thereto blows heated air through a duct 14 into enclosure 10 to thereby warm the air within enclosure 10. Thermostat 11 may have a single selectable temperature at which it maintains the air temperature within enclosure 10 or may have setback capability with a clock and means to record times manually entered by a person and associate these times with individual thermostat settings. The thermostat then selects as the setpoint the thermostat setting with which the time which has most recently occurred, is associated.

Figure 2:
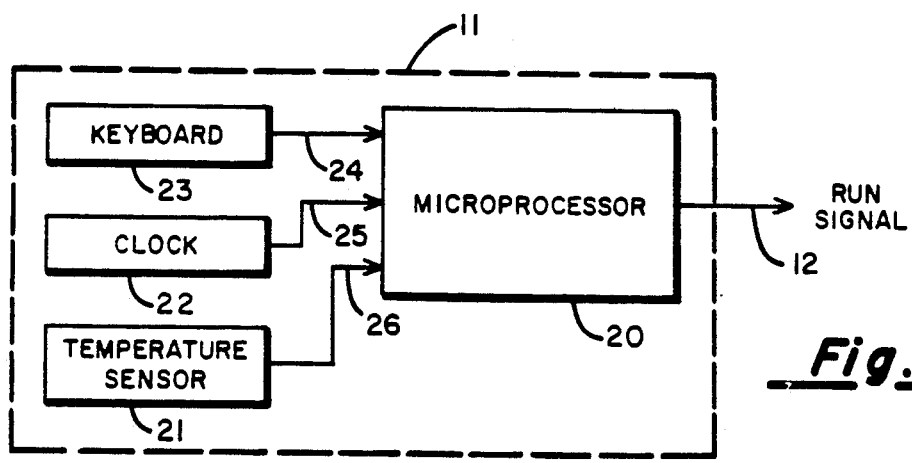
FIG. 2 shows a block diagram of a conventional thermostat for selecting a setback and a comfort temperature and maintaining one or the other temperature depending on the time for example, of the day or week.

FIG. 2 shows a conventional embodiment of thermostat 11 as including a microprocessor 20 receiving as data inputs the space temperature from a temperature sensor 21, the current time from a clock 22, and signals from a keyboard 23 which is under manual control of a human who wishes to control the space temperature within enclosure 10. Keyboard 23 allows the operator to preselect a recovery end time and the comfort temperature setpoint range which the space temperature should reach at the preselectable recovery end time. The data from keyboard 23 is provided on a data path 24 to the microprocessor 20. Clock 22 provides the time of day in a signal encoded on data path 25. In more refined versions, clock 22 may be a week or even year clock to handle situations where the recovery end times may change from day to day or even season to season. A temperature sensor 21 provides a signal which encodes on path 26 the temperature in the vicinity of sensor 21.

Microprocessor 20 may be any of a number of well-known devices which have the capability of receiving and storing information from these external sources described as keyboard 23, clock 22 and temperature sensor 21. No further note need be taken of the procedure by which this information is received and stored. Microprocessor 20 further provides the run signal 12 in response to the input data on paths 24, 25 and 26, and the interpretation or processing by microprocessor 20 of a predetermined set of instructions.

Figure 3:
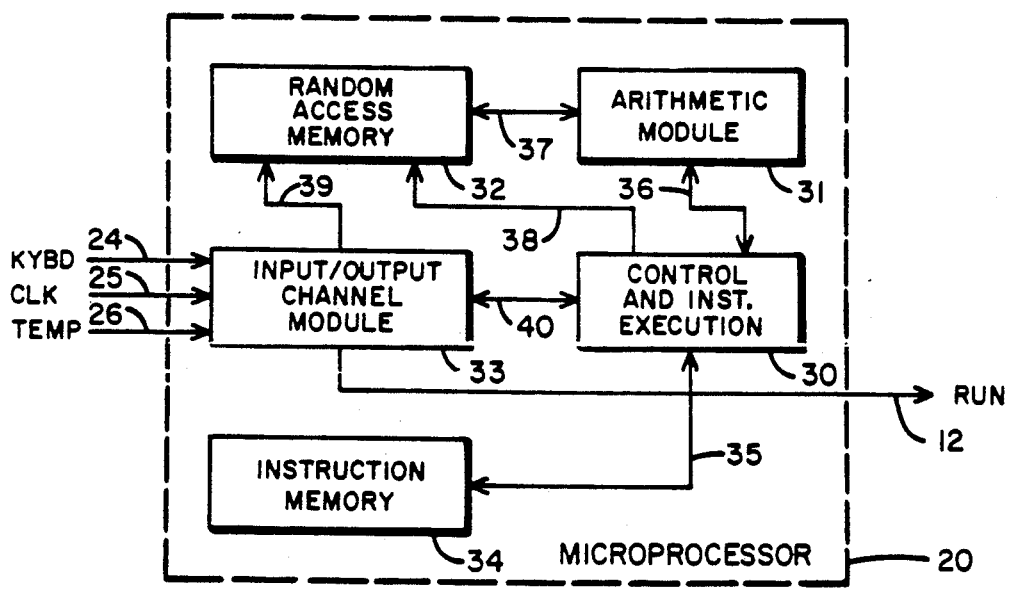
FIG. 3 is a block diagram of a system in which the invention can be implemented.

FIG. 3 shows in block diagram form a microprocessor suitable for implementing the invention. Data is received by an input/output (I/O) channel module 33 from keyboard 23, clock 22 and sensor 21 via the data paths 24, 25 and 26 respectively. I/O channel module 33 functions under control of a control module 30 which executes the instructions which implement this invention. An instruction memory 34 stores the instructions according to which the microprocessor 20 controls the operations of thermostat 11. These instructions are provided to control module 30 on path 35. The sequence of instructions supplied to control module 30 for execution by memory 34 is specified by module 30 on data path 35 based on a predetermined protocol and the state of the microprocessor resulting from previously executed instructions.

As individual data words are received by module 33 from the external sources shown, they are transferred on path 39 to a random access memory 32 where they are stored in individual preselected addressable locations. It is contemplated that at regularly scheduled intervals I/O or communication instructions will be executed by the control module 30 causing the clock and temperature data to be read and stored in memory cells internal to memory 32. After being stored in memory 32, these values are available on data path 37 responsive to control signals sent on path 38 to memory 32 from control module 30. Arithmetic module 31 receives data signals on path 37 from memory 32 and also transmits results of computations performed by it to memory 32 for storage in prearranged memory locations. The selection of arithmetic computations is also specified by execution of particular instructions forming a part of the program within instruction memory 34.

The actual invention is implemented by the execution of a series of instructions (so-called object code) stored within memory 34. These instructions have a physical existence within instruction memory 34 in that there are individual physical elements therein which store and provide them to the control module 30 upon request. Each memory cell is physically altered by virtue of it storing a particular instruction. However, the binary format of the actual instructions (object code) within memory 34 does not allow one to easily understand the invention simply by examining them. Instead, the invention will be described in terms of Tables I and II below which list in so-called pseudocode, the source code statements from which can be derived the object code to be loaded into instruction memory 34 to allow microprocessor 20 to implement the invention. In fact, certain variations of compilers for programs written in the "Basic" programming language can generate object code from the pseudocode of Tables I and II. Furthermore, it is the practice for programmers to preliminarily define a particular software task in pseudocode which can then be manually translated into source code suitable for compiling. Object code derived from Tables I and II will be executed at regular intervals according to a scheduler contained in an operating system within microprocessor 20.

Table II defines variables employed by the software routines of Tables I and II. These definitions are believed to be self-explanatory. Each of these variables is stored in a specific register location within the random access memory 32 of microprocessor 20 and defined by the object code derived from the pseudocode of Tables I and II. It will be helpful to refer to this Table III as these variables are mentioned during the explanation of the Tables I and II programs. Certain of the housekeeping variables used in the fraction function calculation of Table II are not included in Table III.

TABLE I
RECOVERY TIME CALCULATION

```
1   if not in_recovery then
2       time_fraction = fraction_function(space_temp,
            next_therm_set_pt)
3       rec_start_time = sel_rec_end_time −
            (lag-constant * time_fraction)
4       if abs(time − rec_start_time) <
            time_tolerance then
5           in_recovery = true
6           therm_set_pt = next_therm_set_pt
7       endif
8   endif
9   if in_recovery then
10      if abs(therm_set_pt − space_temp) <
            temp_tolerance then
11          meas_rec_end_time = time
12          in_recovery = false
13          lag_constant = lag_constant +
                (meas_rec_end_time −
                sel_rec_end_time)/time_fraction
14          call update_setpoints(time,
                next_therm_set_pt, sel_rec_end_time)
15      endif
16  endif
```

TABLE II
FRACTION FUNCTION CALCULATION

```
fraction_function(space_temp, next_therm_set_pt
20  high_count_limit = 130
21  total counter = 0
22  counter = space_temp
23  while counter < next_therm_set_pt
24  if counter < 50 then
25      count_weight = 1
26  elseif counter < 60 then
27      count_weight = 2
28  elseif counter < 70 then
29      count_weight = 4
30  elseif counter < 80 then
31      count_weight = 6
32  else
33      count_weight = 8
34  endif
35  total_counter = total_counter + count_weight
36  counter = counter + 1
37  wend
38  fraction_function =
        total_counter/high_count_limit
39  end fraction_functon
```

TABLE III
VARIABLE DEFINITIONS

| | | |
|---|---|---|
| LOGICAL | | |
| | in_recovery | if true then in recovery |
| REAL | | |
| | space_temp | temperature of enclosure |
| | therm_set_pt | current thermostat set point |
| | next_therm_set_pt | comfort temperature at the next set point change time (sel_rec_end_time), preselectable by user |
| | time | current time of day, and date if desired |
| | re_start_time | time in which to start recovery |
| | sel_rec_end_time | desired recovery end time, preselectable by user |
| | meas_rec_end_time | measured time when the new comfort temperature is achieved |
| | temp_tolerance | acceptable range of comfort temperature within the temperature controlled enclosure |
| | time_tolerance | acceptable range of the time in which the comfort temperature is achieved |
| | lag_constant | time required to change enclosure temperature from 40° F. to 80° F. |

Figure 4:
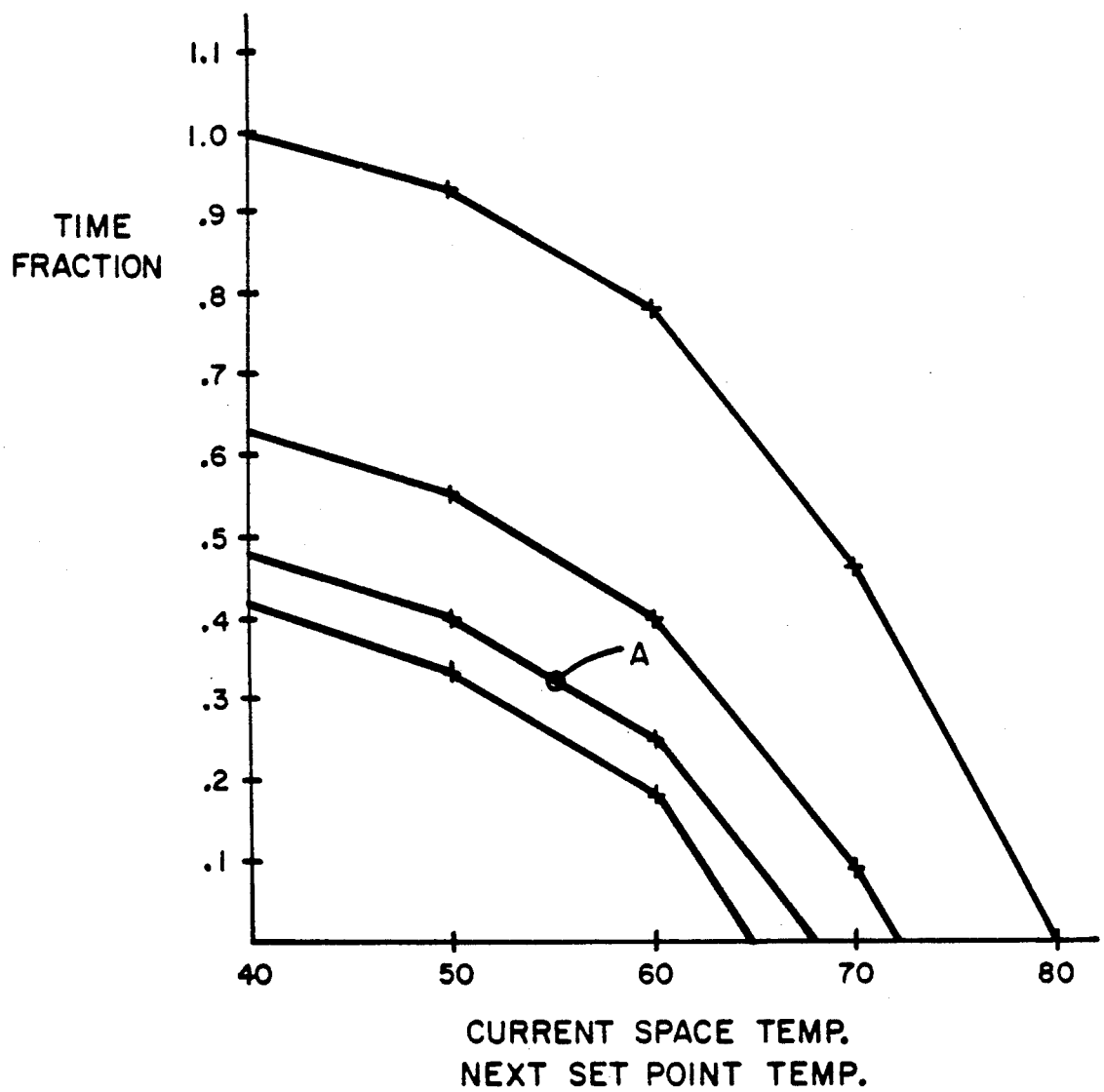
FIG. 4 is a graph of a preferred function which approximately simulates the non-linear response of a typical temperature control device during a period of heating from a cooler setback temperature.

To understand the invention it is also helpful to understand that FIG. 4 displays a family of curves for the time fraction function calculated by the instructions from Table II. The currently preferred recovery time interval is based on the calculations from which the graph of FIG. 4 is derived. The time_fraction variable value on the ordinate is the dependent variable for the two independent variables of space_temp and next_therm_set_pt. The intersection of the space_temp value with that curve which intersects the abscissa at the next_therm_set_pt variable value establishes the time_fraction value for these two independent variables. For example, point A represents the situation for next_therm_set_pt=68° and space_temp=55° and shows the time_fraction value to be 0.325.

Software Function

Execution of object code derived from the statements in Table I by microprocessor 20 causes operation of the invention. The following text discusses and explains the statements in Tables I and II line by line and thereby explains the operation of the invention. As previously stated, a reader skilled in the programming arts can easily transcribe these statements into an input form suitable for a Basic compiler, compile the statements, and load the object code so generated into a microprocessor of choice to implement the invention. For convenience of the reader, individual statements have been numbered and will be identified in the discussion by their individual numbers.

It is assumed that the interval between successive sel_rec_end_time values is sufficient to permit recovery to the thermostat set point associated with the earlier of such a pair of sel_rec_end_time values. This situation can arise where two successive recovery times are so close together that recovery to the temperature of the first recovery time has not been completed before the time at which recovery to the second's temperature must begin to accomplish recovery by the specified time. There are a number of philosophical issues involved in resolving the conflict which arises in such a case which are beyond the scope of this invention.

Execution of the Table I object code begins with testing of the in_recovery logical variable by object code derived from statement 1. As mentioned above, this variable, as are all of the variables in Table III are stored in individual registers within the random access memory of microprocessor 20. If the in_recovery variable value is "not true" then the object code derived from statements 2-6 of Table I is executed. The object code of statement 2 calculates a time fraction value which is a function of the current space_temp and next_therm_set_pt variables by calling the fraction function routine of Table II. The parentheses notation symbolizes the current space_temp and next_therm_set_pt variables as inputs to the fraction function routine. Each value generated by the fraction function routine can be derived by interpolating in FIG. 4. One can see that the temperature derivative of each of the curves shown in FIG. 4 increases in absolute value with increasing current space temperature. This feature will cause a time fraction value to receive a greater contribution from each degree of temperature rise required near the next setpoint temperature than those individual degree intervals which are further from the next setpoint temperature.

After the time_fraction value has been computed, then statement 3 calculates the recovery start time value, rec_start_time, as equal to the sel_rec_end_time value minus the product of a lag constant value times the time_fraction value computed by statement 2. Calculation of the lag constant value will be explained below in connection with statements 9-16 of Table I. The effect of executing statement 3 is to calculate the time at which recovery should start to allow the enclosure temperature to reach the next thermostat set point at the associated recovery end time. By periodically executing this portion of the object code derived from Table I, it is possible to determine this time with adequate accuracy so that the desired comfort temperature is reached at the desired time.

Next (in statement 4) the absolute value of the difference between the current time stored as the time value variable and the time value stored as the rec_start_time variable are compared to be less than the contents of the time_tolerance variable. If this condition is true, then it is necessary to immediately start recovery to achieve the desired set point at the associated time, and for this purpose statements 5 and 6 are next executed. The time_tolerance variable establishes a range of temperatures containing the actual set point, and the thermostat of this invention is designed to call for heat as needed to keep the space temperature within this range. Statement 5 sets the value of the in_recovery logical variable to its true condition. The code of statement 6 sets the therm_set_pt variable to the next_therm_set_pt variable value. By setting the therm_set_pt value to the new set point, the temperature control elements of the thermostat ar conditioned to control to this new set point. In a heating situation for example, this corresponds to turning up the thermostat to the next_therm_set_pt value at this instant. Statements 7 and 8 close or terminate the "if" commands of statements 1 and 2.

Next, execution of the second part of the Table I code comprising statements 9-16, commences. Statements 11-14 are executed only a single time for each recovery type of set point, after the enclosure temperature has reached the therm_set_pt, the desired new temperature set point. These statements have the purpose of determining how closely to the desired recovery end time (sel_rec_end_time) the actual recovery end time (meas_rec_end_time) occurred. The measure of the accuracy with which the each recovery start time was calculated is embodied in the lag_constant value mentioned in connection with statement 3.

Statement 9 tests the in_recovery logical variable and if the value is true then statements 10-15 are performed. If the in_recovery variable value is not true then the code of Table I is exited for this pass through it. Assuming the in_recovery variable value is true then a further test is made of the absolute value of the difference between the current thermostat set point and the space_temp. If this difference is less than the temp_tolerance value then statements 11 and 12 set the measured recovery end time value, meas_rec_end_time, equal to the current time and the in_recovery variable is changed from its true to its false value. Further, statement 13 calculates a new value for the lag_constant variable equal to the difference between the measured recovery end time and the preselectable recovery end time divided by the current value in the time fraction register added to the current value of the lag constant. This new lag constant value then replaces the old lag constant value. The value of the lag constant variable is thus recalculated each time recovery ends to reflect changes in the thermal load on the enclosure. As pointed out in the definition of lag_constant in Table III, the lag_constant value is the current best estimate of the time required to change the enclosure temperature from 40° F. to 80° F. for the example under consideration here. Obviously, these temperatures are chosen as purely exemplary.

Lastly, the next thermostat set point is set by execution of the call command in statement 14. The call command references an update_setpoints subroutine which is not a part of this invention and whose purpose is to simply set the value of the next_therm_set_pt variable to the next thermostat set point and the time (sel_rec_end_time variable) which the next set point temperature should be achieved. The endif statements 15 and 16 terminate the if statements 9 and 10 and also terminate execution of the recovery time calculation code of Table I.

As described earlier, Table II contains code for calculating the fraction function value graphed in FIG. 4. The fraction function routine has the space temperature (space_temp variable) and the next thermostat set point (next_therm_set_pt variable) as its variable inputs. The conventions of Table II are the same as those of Table I. Statements 20-22 in Table II also preset certain variables internal to the code of Table II. These are a high_count_limit variable which is set equal to 130, a total_counter variable which is set equal to zero and a counter variable which is set equal to the enclosure temperature (space_temp variable) most recently sensed by temperature sensor 21 and provided to microprocessor 20 on path 26.

The operation of the fraction function routine in essence divides a predetermined temperature range, in this embodiment all possible temperatures, into a plurality of contiguous intervals. Since the thermostat of which this invention is a part is intended to control the temperature of rooms for human occupants, the part of the temperature range which is of particular interest is approximately 40°-80° F. From 50° to 80° F., these intervals are 10° F. intervals starting at 50° F. There is also an interval comprising all temperatures below 50° and an interval comprising all temperatures above 80° F. An identical count value is assigned to each degree within each one of these intervals. For the interval of all current space temperatures less than 50°, a count weight of 1 is assigned to each degree. For the temperature interval of degree. For the interval for temperatures of 60°–69° inclusive a count value of 4 is assigned to each degree. For the temperature range of 70°–79° inclusive, a count weight of 6 is assigned to each degree. For temperatures of 80° and above a count weight of 8 is assigned to each degree.

The fraction function value is a function of the sum of the count weights for each degree between the space_temp value and the next_therm_set_pt value. For the interval from 40°–80° inclusive, the sum of all count weights is 130. In FIG. 4 this corresponds to the curve which intersects the abscissa at 80° and where the space_temp variable value is 40°. The fraction function value is a normalized value of the count weight sum and is computed by dividing the count weight sum for the space_temp value and the next_therm_set_pt value by the count weight sum for a space_temp value of 40° and a next_therm_set_pt value of 80°. As long as both the space_temp value and the next_therm_set_pt value are within the 40°–80° range, the count value will be less than 130 and the fraction function will be less than 1.

The software of Table II generates values corresponding to the curves shown in FIG. 4. As explained above, the next_therm_set_pt variable selects the particular one of the family of curves in FIG. 4 by specifying its intercept on the abscissa. The space_temp specifying its intercept on the abscissa. The space_temp variable on the abscissa, by its intercept with the curve specified by the next_therm_set_pt variable, specifies the fraction function value on the ordinate. Interpolation can be used for the curves of the family not shown. It can be seen that each of the curves is a function dependent on the preselectable temperature set point and is of the type having a temperature derivative whose absolute value generally increases with increasing temperature. That is, the slope of each curve becomes steeper with increasing current space temperature. Because in this embodiment these curves comprise line segments, the term "generally" is used to imply that there are parts of the individual curves which have a constant slope, and then points at which the slope increases in absolute value. In general, there will be no points at which the slope decreases with increasing temperature. Such a decreasing slope situation implies that the space to be heated or cooled requires less energy input to achieve a specific temperature change when further from the outside temperature than when closer to it. Since heat transfer usually increases with increasing temperature difference between the source and sink, it takes more energy to overcome the added thermal load in such a situation, and the curves of FIG. 4 properly have the specified generally increasing temperature derivative.

At the beginning of the program of Table II, three internal variables must be preset. Statements 20–22 perform this presetting function. These variables are a high count limit variable which is set to 130, a total counter variable which is set to zero and a counter variable which is set equal to the space_temp variable value. Because these variables do not specify parameters of the actual setback and recovery process, they have not been included in Table III.

Statement 23 starts a "while" loop which calculates a numerator from which the value of the fraction function is derived. Such a "while" loop executes the instructions within it recursively so long as the indicated condition of the value in the counter variable is less than the contents of the next_therm_set_pt variable.

A division of the predetermined temperature range into a plurality of contiguous intervals is accomplished by a series of "if" and "elseif" tests in statements 24, 26, 28, and 30. Thus for statement 24, when the value of the counter variable is sensed to be less than 50° F. a count_weight variable is set equal to 1 and the "if" command is terminated. If the condition in statement 24 is not satisfied by the value of the counter variable, then the object code derived from the "elseif" statement 26 is executed, which, if the counter variable value is less than 60° F., causes the count_weight variable to be set equal to 2 and the "if" to terminate. Similar tests result from the "elseif" statements 28 and 30 for temperatures of 70° F. and 80° F., with the "if" statement terminating when the condition is satisfied and the corresponding value to which the count_weight variable is set being 4 or 6 as can be seen from statements 29 and 31. Lastly, an "else" statement 32 causes the count weight to be set to 8 if none of these previous "if" and "elseif" tests are passed. Thus, the "if" command forming statements 24 through 34 always terminates with a value in the count_weight variable of 1, 2, 4, 6, or 8 depending on the current value in the counter variable.

Then the value of the total_counter variable is set equal to its current value plus the value of the count weight variable by executing statement 35. Executing the code of statement 3 follows which increments the counter variable value by one. The "wend" command in statement 37 terminates the "while" loop created by the "while" command if the value in the counter variable does not satisfy the condition of the "while" statement 23. Since the value of the counter variable is incremented by 1 for each pass through the "while" loop, it is clear that the contents of the counter register will become equal to the contents of the next_therm_set_pt register, at which point the "while" loop has been completed and execution of instructions pass to statement 38. At the completion of the "while" command loop from statements 23 to 37, the value of total_counter variable equals the sum of the count weights assigned to each degree of temperature between the space_temp and next_therm_set_pt variable values.

The total_counter variable value is then normalized by dividing it by the value recorded for the high_count_limit variable which, it may be recalled, was originally set to 130 by the code derived from statement 20. In this embodiment, the high_limit_count variable was preset to be equal to the total number of count weights which will be computed if the fraction function routine is executed with the value of the space_temp variable set to 40 and the value of the next_therm_set_pt variable set equal to 80. For these values of the space_temp and next_therm_set_pt variables, the fraction function is equal to 1, which is the maximum temperature range normally encountered for a heating function with setback. In certain applications any of these parameters and interval sizes can be changed to accommodate the particular characteristics of the enclosure 10 and the furnace 13. The parameters can be easily adapted to cooling systems as well to assure optimal recovery time selection in these cases as well.

The code of Tables I and II provides for periodic calculation of an optimal time to start recovery from a temperature setback to a new comfort temperature. Each time recovery has been completed, the actual time at which recovery is completed is compared with the desired time to complete recovery, and the lag constant value is adjusted to correct for any recovery time error present. If the outside temperature changes slowly over a period of days and weeks, it is to be expected that the algorithm which the equipment described above uses will cause the recovery time to adapt to these changing conditions and cause recovery to be completed very close to that desired by the occupant of the space.

Having thus described my invention, what I claim is:

1. A setback thermostat for providing a run signal to a device controlling the temperature in a space, said run signal activating the device so as to change the temperature in the space to reach at a preselectable recovery end time, a preselectable temperature set point range which does not include the current space temperature, including means for receiving and recording the preselectable recovery end time and the preselectable temperature set point range from an external source, said setback thermostat including apparatus for generating the length value of a recovery time interval during which the run signal is provided and at the end of which the space temperature is projected to reach the preselectable temperature set point range, comprising
    (a) means for periodically generating a time fraction value according to a function dependent on the preselectable temperature set point range and of the type having a temperature derivative whose absolute value generally increases with increasing temperature;
    (b) timing means for recording as the measured recovery end time, the time at which the space temperature actually enters the preselectable temperature set point range;
    (c) means for generating and recording a current lag constant value as the sum of a previously recorded lag constant plus a function of the time fraction value and the difference between a previously measured recovery end time and the preselectable recovery end time;
    (d) means for periodically generating and recording a length value of the recovery time interval as a function of the current lag constant value and the current time fraction value; and
    (e) means receiving a recently generated recovery time interval length value, for providing the run signal for the time specified thereby to the space temperature control device.

2. The thermostat of claim 1, wherein the means for periodically generating a length value for the recovery time interval includes means for generating as the length value of the recovery time interval, the product of the lag constant value and the time fraction value.

3. The thermostat of claim 2, wherein the means for generating and recording a current lag constant value includes means for generating as the current lag constant value, a previous lag constant value plus the product of the time fraction value and the difference between a previously generated recovery end time and the current recovery end time.

4. The thermostat of claim 3, wherein the means for generating and recording a time fraction value includes
    (a) means for dividing a predetermined temperature range which includes the preselectable temperature set point range into a plurality of contiguous intervals to each of which is assigned a count value, where count values for a plurality of intervals closer to the preselectable temperature set point range are larger than count values further from the preselectable temperature set point range;
    (b) summing means for summing each count value between the current temperature and the preselectable temperature set point range; and
    (c) generating means for generating the time fraction value as a function of the sum of said count values.

5. The thermostat of claim 4, wherein the generating means includes division means for generating the time fraction value as the quotient of the sum of said count values divided by a constant.

6. The thermostat of claim 5, wherein the division means includes means for dividing the sum of said count values by the sum of all the count values assigned to the plurality of contiguous intervals within the predetermined temperature range.

7. The thermostat of claim 1, wherein the means for generating and recording a time fraction value includes
    (a) means for dividing a predetermined temperature range which includes the preselectable temperature set point range into a plurality of contiguous intervals to each of which is assigned a count value, where count values for a plurality of intervals closer to the preselectable temperature set point range are larger than count values further from the preselectable temperature set point range;
    (b) summing means for summing each count value between the current temperature and the preselectable temperature set point range; and
    (c) generating means for generating the time fraction value as a function of the sum of said count values.

8. The thermostat of claim 7, wherein the generating means includes division means for generating the time fraction value as the quotient of the sum of said count values divided by a constant.

9. The thermostat of claim 8, wherein the division means includes means for dividing the sum of said count values by the sum of all the count values assigned to the plurality of contiguous intervals within the predetermined temperature range.

10. The thermostat of claim 1, wherein the means for generating and recording a current lag constant value includes means for generating as the current lag constant value a previous lag constant value plus the product of the time fraction value and the difference between a previously generated recovery end time and the current recovery end time.

11. In a process for controlling the temperature in a space to enter at a preselectable recovery end time, a preselectable temperature set point range which does not include the current space temperature, said process including receiving and recording the preselectable recovery end time and the preselectable temperature set point range, wherein the improvement includes steps for generating the length value of a recovery time interval at the beginning of which interval the temperature within the space begins to change and at the end of which the space temperature is projected to reach the preselectable temperature set point range, comprising
    (a) periodically generating a time fraction value according to a function dependent on the preselectable temperature set point range and of the type having a temperature derivative whose absolute value increases with increasing temperature;

(b) recording as the measured recovery end time, the time at which the space temperature actually enters the preselectable temperature set point range;

(c) generating and recording a current lag constant value as the sum of a previously recorded lag constant plus a function of the time fraction value and the difference between a previously measured recovery end time and the preselectable recovery end time;

(d) periodically generating and recording a length value of the recovery time interval as a function of the current lag constant value and the current time fraction value; and (e) starting to change the space temperature when the time to the recovery end time approximately equals a recently generated recovery time interval length value.

12. The process of claim 11, wherein the step of periodically generating a length value for the recovery time interval includes a step for generating as the length value of the recovery time interval, the product of the lag constant value and the time fraction value.

13. The process of claim 11, wherein the step of generating and recording a current lag constant value includes a step for generating as the current lag constant value, a previous lag constant value plus the product of the time fraction value and the difference between a previously generated recovery end time and the current recovery end time.

14. The process of claim 13, wherein the step of generating and recording a time fraction value includes (a) dividing a predetermined temperature range which includes the preselectable temperature set point range into a plurality of contiguous intervals to each of which is assigned a count value, where count values for a plurality of intervals closer to the preselectable temperature set point range are larger than count values further from the preselectable temperature set point range;

(b) summing each count value between the current temperature and the preselectable temperature set point range; and (c) generating the time fraction value as a function of the sum of said count values.

15. The process of claim 14, wherein the generating step includes the step of dividing the sum of said count values by a constant.

16. The process of claim 15, wherein the dividing step includes the step of dividing the sum of said count values by the sum of all the count values assigned to the plurality of contiguous intervals within the predetermined temperature range.

17. The process of claim 11, wherein the step of periodically generating a length value for the recovery time interval includes a step for generating as the length value of the recovery time interval, the product of the lag constant value and the time fraction value.

18. The process of claim 11, wherein the step of generating and recording a time fraction value includes (a) dividing a predetermined temperature range which includes the preselectable temperature set point range into a plurality of contiguous intervals to each of which is assigned a count value, where count values for a plurality of intervals closer to the preselectable temperature set point range are larger than count values further from the preselectable temperature set point range;

(b) summing each count value between the current temperature and the preselectable temperature set point range; and (c) generating the time fraction value as a function of the sum of said count values.

19. The process of claim 18, wherein the generating step includes the step of dividing the sum of said count values by a constant.

20. The process of claim 19, wherein the dividing step includes the step of dividing the sum of said count values by the sum of all the count values assigned to the plurality of contiguous intervals within the predetermined temperature range.

* * * * *